United States Patent
Salehpour

(10) Patent No.: US 9,509,697 B1
(45) Date of Patent: Nov. 29, 2016

(54) SYSTEMS AND METHODS FOR AUTHORIZING ATTEMPTS TO ACCESS SHARED LIBRARIES

(71) Applicant: Symantec Corporation, Mountain View, CA (US)

(72) Inventor: Jonathon Salehpour, Upland, CA (US)

(73) Assignee: Symantec Corporation, Mountain View, CA (US)

( * ) Notice: Subject to any disclaimer, the term of this patent is extended or adjusted under 35 U.S.C. 154(b) by 173 days.

(21) Appl. No.: 14/486,323

(22) Filed: Sep. 15, 2014

(51) Int. Cl.
*H04L 29/06* (2006.01)

(52) U.S. Cl.
CPC ..................... *H04L 63/10* (2013.01)

(58) Field of Classification Search
CPC ........................................... H04L 63/10
USPC ............................................... 726/1
See application file for complete search history.

(56) References Cited

U.S. PATENT DOCUMENTS

| | | | | |
|---|---|---|---|---|
| 6,029,206 | A * | 2/2000 | Endicott | G06F 8/67 710/200 |
| 2008/0201760 | A1 * | 8/2008 | Centonze | H04L 63/102 726/1 |
| 2012/0291138 | A1 | 11/2012 | Haga et al. | |
| 2013/0055216 | A1 * | 2/2013 | Soejima | G06F 11/3672 717/128 |
| 2014/0059357 | A1 | 2/2014 | Andersson et al. | |

OTHER PUBLICATIONS

Bruce McCorkendale, et al.; Systems and Methods for Authenticating an Application; U.S. Appl. No. 14/181,410, filed Feb. 14, 2014.
"StackTraceElement", http://developer.android.com/reference/java/lang/StackTraceElement.html, as accessed Jul. 30, 2014, (Mar. 2, 2009).
"<intent-filter>", http://developer.android.com/guide/topics/manifest/intent-filter-element.html, as accessed Jun. 8, 2014, (Feb. 13, 2009).
"ClipboardManager", http://developer.android.com/reference/android/text/ClipboardManager.html, as accessed Jun. 8, 2014, (Feb. 18, 2009).
"SAFE Samsung for Enterprise", http://www.samsung.com/us/business/samsung-for-enterprise/, as accessed Jun. 8, 2014, (Dec. 26, 2012).
"Samsung KNOX", http://www.samsung.com/global/business/mobile/platform/mobile-platform/knox/, as accessed Jun. 8, 2014, (Mar. 14, 2014).
Jonathon Salehpour, et al; Systems and Methods for Filtering Interprocess Communications; U.S. Appl. No. 14/451,037, filed Aug. 4, 2014.
"Android Binder", http://elinux.org/Android_Binder, as accessed Jun. 8, 2014, (Jun. 20, 2011).

(Continued)

*Primary Examiner* — Jacob Lipman
(74) *Attorney, Agent, or Firm* — Fisherbroyles, LLC

(57) ABSTRACT

The disclosed computer-implemented method for authorizing attempts to access shared libraries may include (1) detecting an attempt by a process to access a shared library, (2) identifying a call stack of the process, (3) inspecting the call stack to determine whether a method that initiated the attempt is authorized to access the shared library, and (4) causing the attempt to be allowed if the method is authorized to access the shared library or blocked if the method is not authorized to access the shared library. Various other methods, systems, and computer-readable media are also disclosed.

20 Claims, 9 Drawing Sheets

(56) References Cited

OTHER PUBLICATIONS

"Class StackTraceElement", http://docs.oracle.com/javase/7/docs/api/java/lang/StackTraceElement.html, as accessed Jul. 30, 2014, Oracle, (1993).

"Trail: The Reflection API", http://docs.oracle.com/javase/tutorial/reflect/, as accessed Jul. 30, 2014, The Java™ Tutorials, Oracle, (1995).

"Obtaining Method Type Information", http://docs.oracle.com/javase/tutorial/reflect/member/methodType.html, as accessed Jul. 30, 2014, The Java™ Tutorials, Oracle, (1995).

"Call Stacks and Program Execution", http://docs.oracle.com/cd/E24457_01/html/E21994/afamv.html, as accessed Jul. 30, 2014, Oracle Solaris Studio 12.3: Performance Analyzer, Oracle Solaris Studio 12.3 Information Library, Oracle, (2009).

"Symantec Insight", http://www.symantec.com/reputation-based-security, as accessed Jul. 30, 2014, Symantec Corporation, (1995).

"Lesson: Members", http://docs.oracle.com/javase/tutorial/reflect/member/index.html, as accessed Jul. 30, 2014, The Java™ Tutorials, Oracle, (1995).

"Class Method", http://docs.oracle.com/javase/8/docs/api/java/lang/reflect/Method.html, as accessed Jul. 30, 2014, Oracle, (1993).

"Class StackTraceElement", http://docs.oracle.com/javase/7/docs/api/java/lang/StackTraceElement.html#StackTraceElement%28java.lang.String,%20java.lang.String,%20java.lang.String,%20int%29, as accessed Jul. 30, 2014, Oracle, (1993).

"Call stack", http://en.wikipedia.org/wiki/Call_stack, as accessed Jul. 30, 2014, Wikipedia, (Dec. 15, 2005).

"Process (computing)", http://en.wikipedia.org/wiki/Process_(computing), as accessed Jul. 30, 2014, Wikipedia, (Apr. 23, 2004).

"Call Stack", http://www.techopedia.com/definition/25586/call-stack-c, as accessed Jul. 30, 2014, Techopedia, (2010).

\* cited by examiner

SYSTEMS AND METHODS FOR AUTHORIZING ATTEMPTS TO ACCESS SHARED LIBRARIES

BACKGROUND

On many computing platforms (e.g., the ANDROID platform), shared libraries may be used to provide various resources and functionalities to multiple programs. A shared library may use various application programming interface (API) methods to expose the resources and functionalities that it provides to programs, and a program that loads a shared library may access a resource or functionality provided by the shared library by calling the API method that exposes the resource or functionality. In some cases, a provider of a shared library may wish to limit access to certain API methods to only authorized callers.

Using traditional methods, a provider of a shared library may be able to limit access to an API method to a set of authorized programs. Unfortunately, limiting access to an API method to a set of authorized programs may be problematic in a variety of situations. For example, some computing platforms may enable an unauthorized program to cause an authorized program to access an API method of a shared library on behalf of the unauthorized program. As a result, a call to an API method that is initiated by the unauthorized program may appear to be from the authorized program and allowed by the shared library. In other situations, an authorized program may be injected with malicious code. As a result, a call to an API method that is initiated by the malicious code may appear to be from the authorized program and allowed by the shared library. Accordingly, the instant disclosure identifies and addresses a need for additional and improved systems and methods for authorizing attempts to access shared libraries.

SUMMARY

As will be described in greater detail below, the instant disclosure describes various systems and methods for authorizing attempts to access shared libraries. In one example, a computer-implemented method for authorizing attempts to access shared libraries may include (1) detecting an attempt by a process to access a shared library, (2) identifying a call stack of the process, (3) inspecting the call stack to determine whether a method that initiated the attempt is authorized to access the shared library, and (4) causing the attempt to be allowed if the method is authorized to access the shared library or blocked if the method is not authorized to access the shared library.

In some examples, the step of inspecting the call stack may include (1) identifying the method that initiated the attempt by identifying a stack frame of the method within the call stack, (2) identifying a policy (e.g., a blacklist) that indicates that the method is not authorized to access the shared library, and (3) determining that the method is not authorized to access the shared library based on the policy.

In some examples, the step of inspecting the call stack of the process may include (1) identifying the method that initiated the attempt by identifying a stack frame of the method within the call stack, (2) identifying a policy (e.g., a whitelist) that indicates that the method is authorized to access the shared library, and (3) determining that the method is authorized to access the shared library based on the policy.

In some examples, the step of inspecting the call stack may include (1) identifying the method that initiated the attempt by identifying a stack frame of the method within the call stack, (2) determining that the method is used to perform inter-process communications, and (3) determining that the method is not authorized to access the shared library based on determining that the method is used to perform inter-process communications.

In some examples, the step of inspecting the call stack may include (1) identifying the method that initiated the attempt by identifying a stack frame of the method within the call stack, (2) determining that the method is used to perform task delegations, and (3) determining that the method is not authorized to access the shared library based on determining that the method is used to perform task delegations.

In some examples, the step of inspecting the call stack may include (1) identifying the method that initiated the attempt by identifying a stack frame of the method within the call stack, (2) determining that the method initiated the attempt via reflection, and (3) determining that the method is not authorized to access the shared library based on determining that the method initiated the attempt via reflection.

In some examples, the step of inspecting the call stack may include (1) inspecting the call stack of the process to identify a call order of two or more methods that initiated the attempt and (2) determining that the method is not authorized to access the shared library based on the call order of the two or more methods that initiated the attempt.

In some examples, the step of inspecting the call stack may include (1) inspecting the call stack of the process to identify a call order of two or more methods that initiated the attempt, (2) determining that the call order of the methods is different than a previous call order of the methods, and (3) determining that the method is not authorized to access the shared library based on determining that the call order of the methods is different than the previous call order of the methods.

In some examples, the step of inspecting the call stack may include (1) identifying the method that initiated the attempt by identifying a stack frame of the method within the call stack, (2) determining that the method has been designated as untrustworthy, and (3) determining that the method is not authorized to access the shared library based on determining that the method has been designated as untrustworthy.

In some examples, the step of inspecting the call stack may include (1) identifying the method that initiated the attempt by identifying a stack frame of the method within the call stack, (2) determining that the method has been designated as trustworthy, and (3) determining that the method is authorized to access the shared library based on determining that the method has been designated as trustworthy.

In one embodiment, the computer-implemented method may further include (1) assigning a token to the process if the method is authorized to access the shared library, (2) receiving the token as part of a subsequent attempt by the process to access the shared library, and (3) causing, in response to receiving the token, the subsequent attempt to be allowed without inspecting a call stack associated with the subsequent attempt.

In one embodiment, a system for implementing the above-described method may include (1) a detection module, stored in memory, that detects an attempt by a process to access a shared library, (2) an identification module, stored in memory, that identifies a call stack of the process, (3) an inspection module, stored in memory, that inspects the call stack to determine whether a method that initiated the attempt is authorized to access the shared library, (4) an access module, stored in memory, that causes the attempt to be allowed if the method is authorized to access the shared library or blocked if the method is not authorized to access the shared library, and (5) at least one physical processor configured to execute the detection module, the identification module, the inspection module, and the access module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect an attempt by a process to access a shared library, (2) identify a call stack of the process, (3) inspect the call stack to determine whether a method that initiated the attempt is authorized to access the shared library, (4) cause the attempt to be allowed if the method is authorized to access the shared library or blocked if the method is not authorized to access the shared library.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
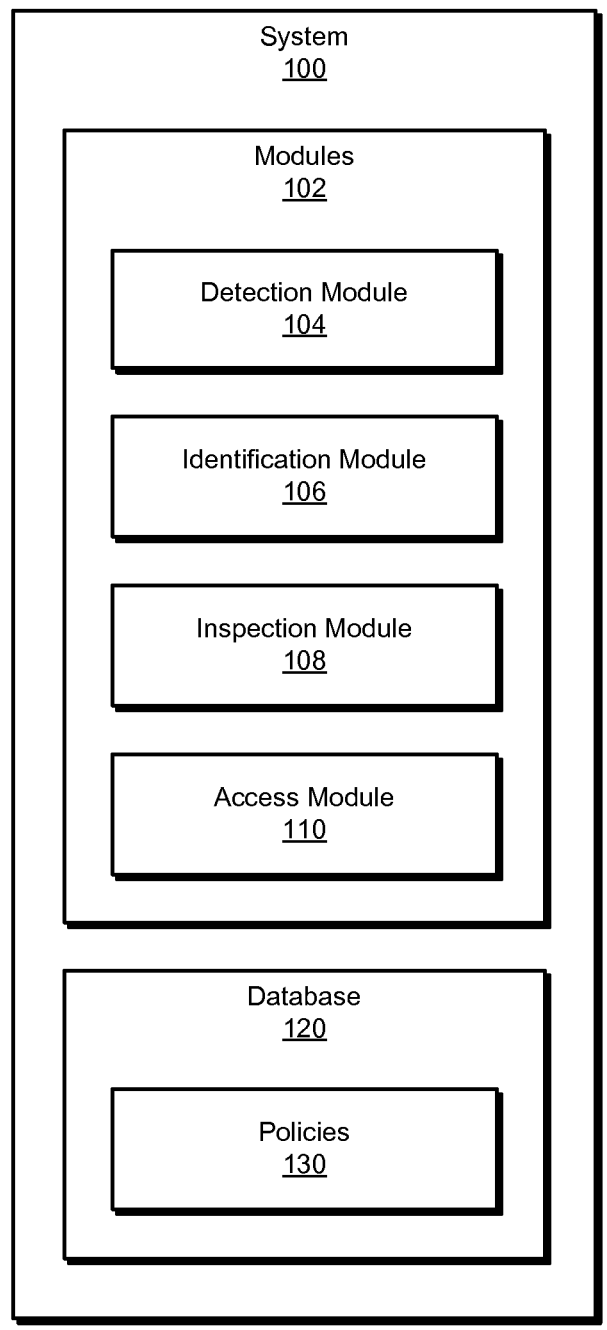
FIG. 1 is a block diagram of an exemplary system for authorizing attempts to access shared libraries.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for authorizing attempts to access shared libraries. As will be described in greater detail below, by inspecting the call stacks of the processes that are attempting to access shared libraries, the disclosed systems and methods may determine whether to allow the attempts to access the shared libraries. In one example, the disclosed systems and methods may detect an attempt by a process to access a shared library and may determine whether the attempt to access the shared library should be allowed or blocked by (1) inspecting a call stack of the process to identify the methods that initiated the call to the shared library, (2) determining whether the methods are or are not authorized to access the shared library, and (3) determining that the attempt should be allowed if each method is authorized or blocked if any method is not authorized. By determining whether an attempt by a process to access the shared library should be allowed or blocked based on whether the methods of the process that initiated the attempt are authorized to access the shared library, the systems and methods disclosed herein may prevent certain methods of the process from accessing the shared library and/or may prevent the process from accessing the shared library in certain contexts (e.g., an inter-process communication, task delegation, or reflection context). Embodiments of the instant disclosure may also provide various other advantages and features, as discussed in greater detail below.

Figure 2:
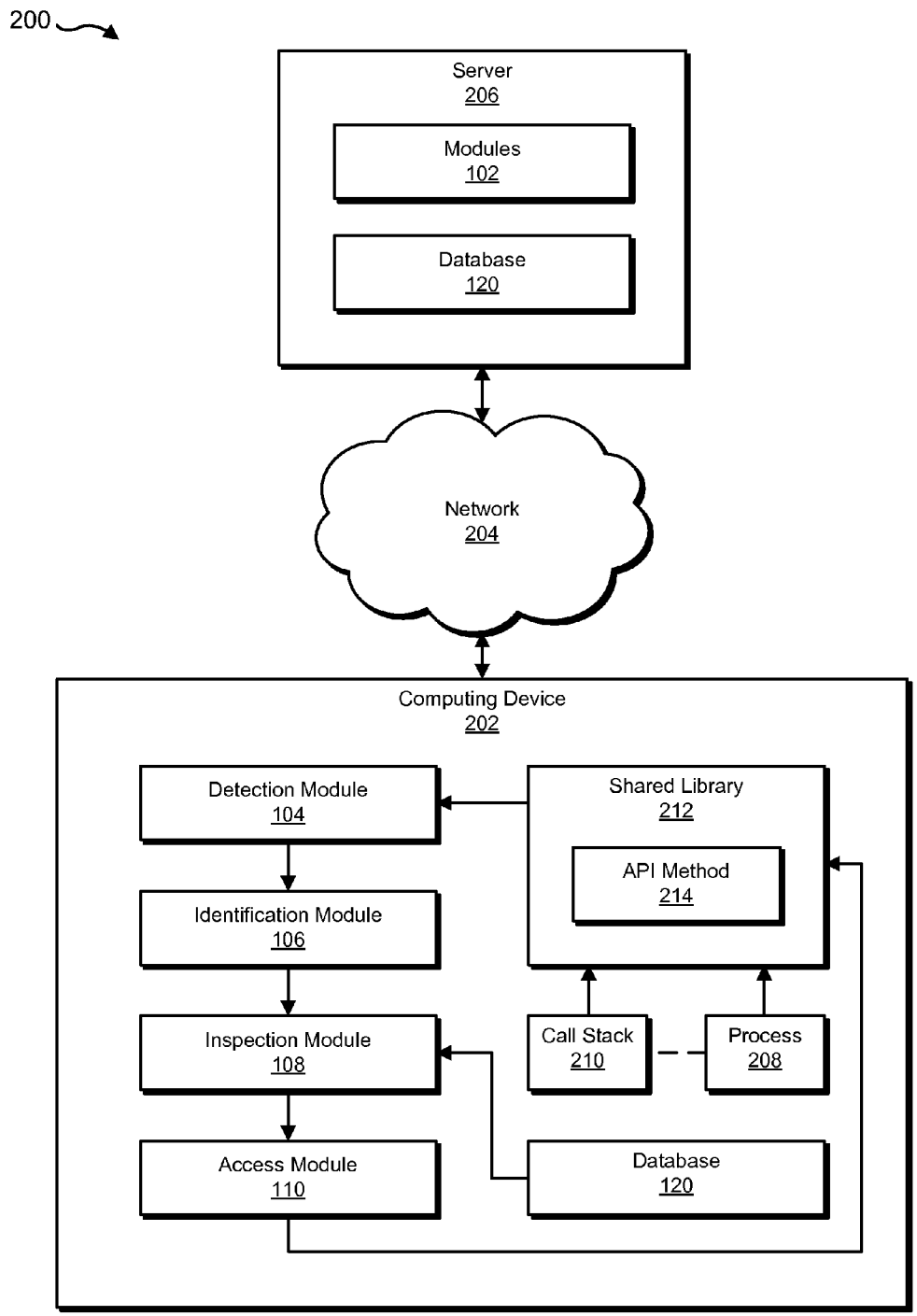
FIG. 2 is a block diagram of an additional exemplary system for authorizing attempts to access shared libraries.

The following will provide, with reference to FIGS. 1-2, detailed descriptions of exemplary systems for authorizing attempts to access shared libraries. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of exemplary system 100 for authorizing attempts to access shared libraries. As illustrated in this figure, exemplary system 100 may include one or more modules 102 for performing one or more tasks. For example, and as will be explained in greater detail below, exemplary system 100 may include a detection module 104 that may detect an attempt by a process to access a shared library. Exemplary system 100 may additionally include an identification module 106 that may identify a call stack of the process. Exemplary system 100 may also include an inspection module 108 that may inspect the call stack to determine whether a method that initiated the attempt is authorized to access the shared library. Exemplary system 100 may additionally include an access module 110 that may cause the attempt to be allowed if the method is authorized to access the shared library or blocked if the method is not authorized to access the shared library. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 810 in FIG. 8, and/or portions of exemplary network architecture 900 in FIG. 9. In one example, one or more of modules 102 in FIG. 1 may represent all or a portion of authorization system 410 in FIG. 4. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more policies 130 that indicate whether methods are authorized to access shared libraries. Database 120 may represent portions of a single database or computing device or a plurality of databases or computing devices. For example, database 120 may represent a portion of computing device 202 or server 206 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as computing device 202 or server 206 in FIG. 2, computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to authorize attempts to access shared libraries. For example, and as will be described in greater detail below, detection module 104 may detect an attempt by a process 208 to access a shared library 212 by detecting that process 208 has called API Method 214. Identification module 106 may identify a call stack 210 of process 208. Inspection module 108 may inspect call stack 210 to determine whether a method that initiated the attempt (e.g., methods 534-540 in FIG. 5) is authorized to access shared library 212. Access module 110 may cause the attempt to be allowed if the method is authorized to access shared library 212 or blocked if the method is not authorized to access shared library 212.

Computing device 202 generally represents any type or form of computing device capable of reading computer-executable instructions. Examples of computing device 202 include, without limitation, laptops, tablets, smartphones, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and server 206.

Figure 3:
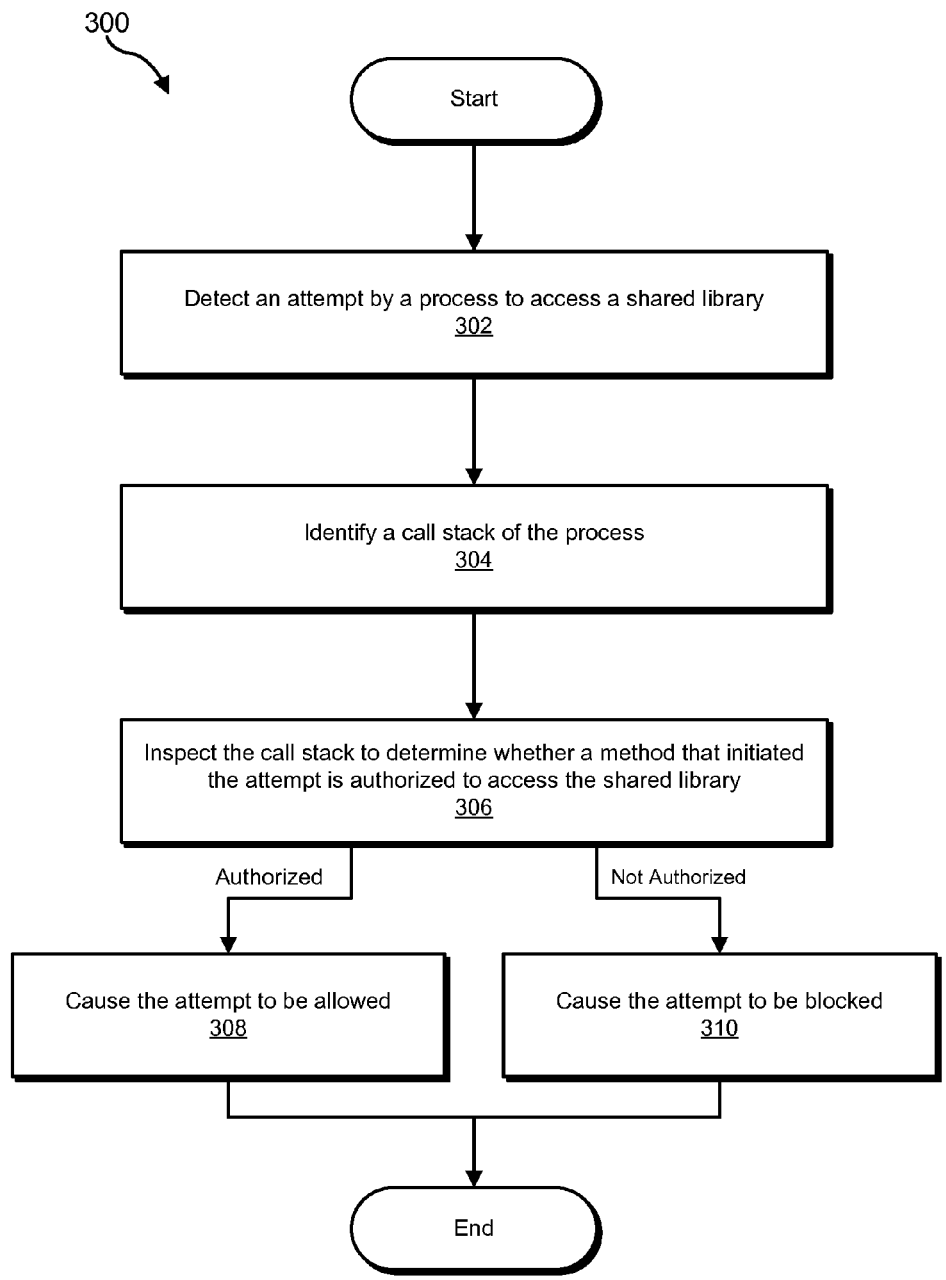
FIG. 3 is a flow diagram of an exemplary method for authorizing attempts to access shared libraries.
Figure 4:
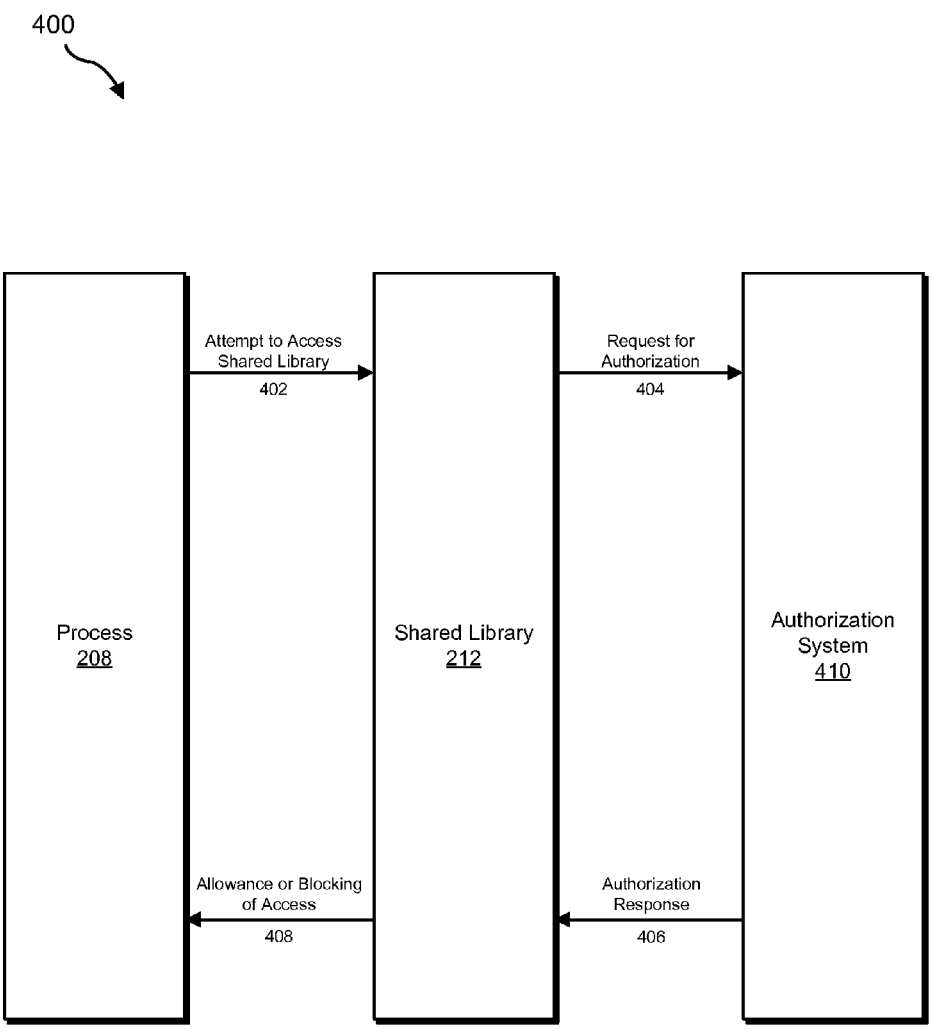
FIG. 4 is a flow diagram of an additional exemplary method for authorizing attempts to access shared libraries.

FIG. 3 is a flow diagram of an exemplary computer-implemented method 300 for authorizing attempts to access shared libraries. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302, one or more of the systems described herein may detect an attempt by a process to access a shared library. For example, detection module 104 may, as part of computing device 202 in FIG. 2, detect an attempt by process 208 to access shared library 212.

As used herein, the term "process" refers generally to an instance of a computer program that is being executed on a computing device to cause the computing device to perform useful tasks. In some examples, a process may use a shared library to access resources and functionalities maintained by the shared library. To do so, the process may load the shared library at runtime and access the resources and functionalities of the shared library exposed through an API method of the shared library. Using FIG. 2 as an example, process 208 may load shared library 212 at runtime and access a resource or functionality of shared library 212 exposed through API method 214.

As used herein, the term "shared library" refers generally to a collection of precompiled functionalities and/or resources stored in a format that is accessible by multiple processes. By loading a shared library, a process may use the resources and/or functionalities of the shared library without having to implement the resources and/or functionalities itself. Examples of resources and/or functionalities that may be provided by a shared library include, without limitation, file system functionalities (such as the ability to read a file system), network functionalities (such as the ability to scan traffic on a network), data-access functionalities (such as the ability to block copy-paste events), and/or administrative functions (such as the ability to block applications from being installed on a computing device).

Returning to FIG. 3, detection module 104 may detect an attempt by a process to access a shared library in a variety of contexts. In one example, detection module 104 may detect an attempt by a process to access a shared library as part of the shared library. Using FIG. 4 as an example, detection module 104 may, as part of shared library 212, detect the attempt to access shared library 212 made by process 208 at step 402. In these examples, detection module 104 may detect the attempt to access the shared library when the process attempts to access the shared library.

Additionally or alternatively, detection module 104 may detect an attempt by a process to access a shared library as part of a local authorization system (e.g., authorization system 410 in FIG. 4) that executes on the same computing device as the process. In this example, detection module 104 may, as part of the authorization system, perform authorization functions for one or more shared libraries and may detect an attempt by a process to access a shared library by receiving a request from the shared library to authorize the attempt. For example, as illustrated in step 402 of FIG. 4, process 208 may attempt to access shared library 212. In response, as shown at step 404, shared library 212 may send a request to authorize the attempt to authorization system 410. In this example, detection module 104 may, as part of authorization system 410, detect the attempt by receiving the request from shared library 212.

In some examples, detection module 104 may detect an attempt by a process to access a shared library as part of a remote authorization system (e.g., authorization system 410 in FIG. 4) that executes on a computing device that is remote from the computing device executing the process. Using FIG. 2 as an example, detection module 104 may detect an attempt by process 208 to access shared library 212 as part of an authorization system on server 206.

In some examples, detection module 104 may also detect the API method of a shared library that a process is attempting to access, such as API method 214 in FIG. 2. As will be discussed in greater detail below, by detecting the API methods of a shared library that processes are attempting to access, the systems and methods disclosed herein may determine when a particular process is or is not authorized to access a particular API method. In some examples, this may allow a provider of a shared library to protect some resources or functionalities of a shared library more than others.

Returning now to FIG. 3, at step 304, one or more of the systems described herein may identify a call stack of the process. For example, identification module 106 may, as part of computing device 202 in FIG. 2, identify call stack 210 of process 208.

As used herein, the term "call stack" refers generally to a data structure that stores information about the active methods of a process. In some examples, a call stack may store a record of methods called at the run time of a process and the order in which the methods were called. As such, when a call to an API method of a shared library is made and after control has passed to the API method of the shared library, the call stack of a process may include a record of the methods that initiated the call to the API method and the order in which the methods were called. As will be explained in greater detail below, the systems and methods described herein may use the call stack of a process to identify individual methods within the process that initiated an attempt to access a shared library. The term "method," as used herein, refers generally to a sequence of program instructions that perform a specific task. In some examples, the term "method" may refer to an active subroutine of a process initiating an attempt to access a shared library.

Returning to FIG. 3, identification module 106 may identify a call stack in a variety of contexts. In some examples, identification module 106 may identify the call stack as part of a shared library. Identification module 106 may, as part of a shared library, identify a call stack using any suitable stack-introspection functionality provided by the platform on which the shared library is running. For example, identification module 106 may, as part of a shared library running on the ANDROID platform, identify a call stack by calling the JAVA method "Thread.getCurrent( ).getStackTrace( )."

Additionally or alternatively, identification module 106 may identify a call stack as part of an authorization system (e.g., authorization system 410 in FIG. 4) that performs authorization functions for one or more shared libraries by receiving a representation of the call stack from a shared library as part of an authorization request. Using FIG. 4 as an example, shared library 212 may, at step 404, send a representation of a call stack to authorization system 410 as part of a request to authorize the attempt made by process 208 at step 402. In this example, identification module 106 may, as part of authorization system 410, identify the call stack by receiving the request from shared library 212.

Returning to FIG. 3, at step 306, one or more of the systems described herein may inspect the call stack to determine whether a method that initiated the attempt is authorized to access the shared library. For example, inspection module 108 may, as part of computing device 202 in FIG. 2, inspect call stack 210 to determine whether or not one or more of methods 534-540 in FIG. 5 is authorized to access shared library 212.

Inspection module 108 may inspect the call stack to determine whether the method that initiated the attempt is authorized to access the shared library in a variety of ways. In one example, inspection module 108 may (1) use the call stack to identify one or more of the methods that initiated the attempt and then (2) determine whether one or more of the identified methods are authorized to access the shared library.

Inspection module 108 may use a call stack to identify one or more of the methods that initiated an attempt to access a shared library in a variety of ways. In one example, inspection module 108 may use the stack frames within a call stack to identify the one or more methods. A call stack may include several stack frames. Using FIG. 5 as an example, call stack 210 may include stack frames 512-520. Each stack frame within a call stack may contain information about the currently executing methods of a process. As such, when a call to an API method of a shared library is made by a method of a process and after control has passed to the API method of the shared library, the call stack of the process may include a stack frame of the API method and one or more additional stack frames of the methods that initiated the call to the API method.

Figure 5:
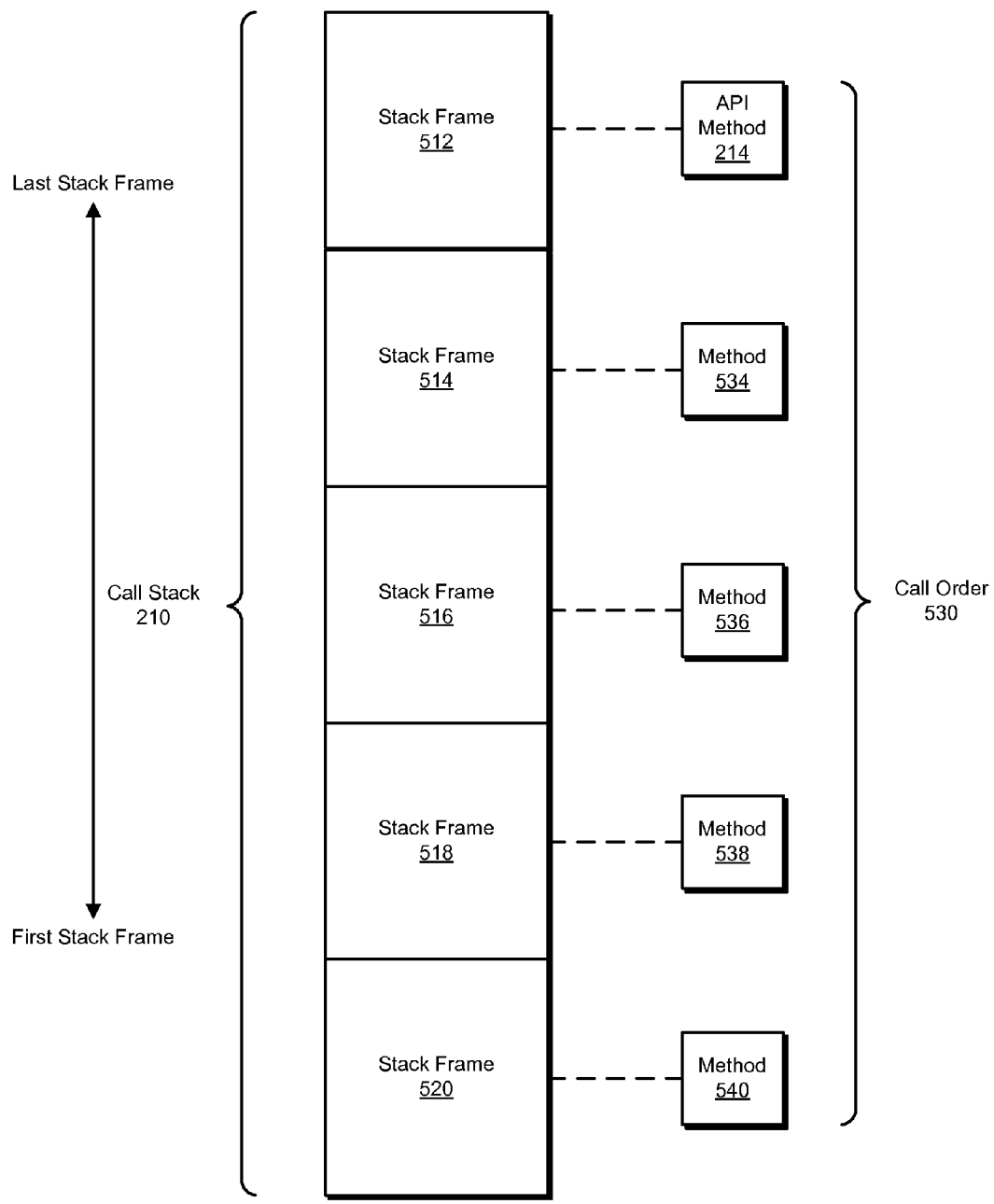
FIG. 5 is a block diagram of an exemplary call stack and an exemplary call order of the exemplary call stack.

Using FIG. 5 as an example, when a call to API method 214 is made by a method of process 208 and after control has passed to API method 214, call stack 210 may include stack frames 512-520. In this example, stack frame 512 may contain information about API method 214, stack frame 514 may contain information about method 534 (the method that called API method 214), stack frame 516 may contain information about method 536 (the method that called method 534), stack frame 518 may contain information about method 538 (the method that called method 536), and stack frame 520 may contain information about method 540 (the method that called method 538).

In some examples, inspection module 108 may use a call stack to identify one or more methods that initiated a call to a shared library by iterating through the stack frames of the call stack. Using FIG. 5 as an example, inspection module 108 may use call stack 210 to identify methods 534-540 that initiated a call to API method 214 of shared library 212 by iterating through stack frames 514-520. On some platforms (e.g., the ANDROID platform), the inspection module 108 may be able to identify the method name, class name, and/or package name associated with the method represented by a stack frame.

Once inspection module 108 has identified one or more of the methods that initiated an attempt to access a shared library, inspection module 108 may determine whether the methods are authorized to access the shared library. In one example, inspection module 108 may determine whether a method is authorized to access a shared library based on a policy associated with the shared library (e.g., a blacklist of unauthorized methods or a whitelist of authorized methods). In some examples, inspection module 108 may generate such policies by enabling a provider of a shared library to specify certain method names, class names, and/or package names associated with the methods that the provider would like to be authorized or unauthorized to access the shared library. In some examples, inspection module 108 may enable a provider of a shared library to specify certain method names, class names, and/or package names of inter-process communication, task-delegation, and/or reflection methods that the provider would like to be unauthorized to access the shared library. In this way, the systems and methods described herein may allow the provider to prevent the shared library from being accessed via an inter-process communication, task-delegation, and/or reflection mechanism.

As used herein, the term "task delegation" refers generally to an inter-process communication mechanism whereby a first process may compel a second process to perform a task on behalf of the first process. An example of a method that may be used to perform task delegation on the ANDROID platform may include the method "android.os.Binder.execTransact( )" The term "reflection," as used herein, refers generally to a mechanism that enables a method to identify and call discoverable methods of the process within which the method executes. In some examples, reflection may be used by malicious code to identify and call shared-library methods. For example, when malicious code has been loaded into an executing process, the malicious code may function as part of the executing process and may use reflection to identify and call discoverable methods of the executing process. An example of a method that may be used to perform reflection on the ANDROID platform may include the method "java.lane.reflection.Method.invoke( )" In general, if an attempt to access a shared library was performed via an inter-process communication, task-delegation, or reflection mechanism, inspection module 108 may use the call stack of the shared library to identify the inter-process communication, task-delegation, or reflection method that initiated the attempt (e.g., as described above).

In some examples, inspection module 108 may generate policies by enabling a provider of a shared library to select a type of method that the provider would like to be authorized or unauthorized to access the shared library. For example, inspection module 108 may enable a provider to select to make inter-process communication, task-delegation, and/or reflection methods authorized or unauthorized to access a shared library. In one example, inspection module 108 may generate a policy based on a provider's selection by adding, to the policy, some or all of the method names, class names, and/or package names associated with the type of method selected by the provider. For example, if a provider of a shared library that runs on the ANDROID platform chooses to make task delegation methods unauthorized to access a shared library, inspection module 108 may add the method "android.os.Binder.execTransact( )" to a blacklist associated with the shared library. Similarly, if a provider of a shared library that runs on the ANDROID platform chooses to make reflection methods unauthorized to access the shared library, inspection module 108 may add the method "java.lane.reflection.Method.invoke( )" to a blacklist associated with the shared library.

Inspection module 108 may use a policy associated with a shared library to determine whether a method is authorized to access the shared library by determining whether the method name, class name, package name, or method type of the method matches the method name, class name, package name, or method type contained within the policy. For example, inspection module 108 may determine that a method is authorized to access a shared library if the method name, class name, package name, or method type of the method matches a method name, class name, package name, or method type contained in a whitelist associated with the shared library. Similarly, inspection module 108 may determine that a method is unauthorized to access a shared library if the method name, class name, package name, or method type of the method matches a method name, class name, package name, or method type contained in a blacklist associated with the shared library.

In at least one example, inspection module 108 may use a policy associated with a particular API method of a shared library to determine whether a method is authorized to access the API method of the shared library. In this way, API methods of a shared library that are associated with protected resources and/or functionalities may have policies with more stringent prerequisites for authorization than API methods associated with resources and/or functionalities that are not protected.

In addition or as an alternative to using policies, inspection module 108 may determine whether the methods that initiated an attempt to access a shared library are authorized to access the shared library based on a call order of the methods. In one example, inspection module 108 may identify a call order of the methods that initiated an attempt to access a shared library by determining the order of the method's associated stack frames within a call stack associated with the attempt. Inspection module 108 may then compare the identified call order of the methods with a previous call order of the same methods and determine that the methods are not authorized to access the shared library if the identified call order differs from the previous call order of the same methods. In some examples, a difference in call orders may indicate that an attempt to access the shared library was initiated by malicious code.

Figure 6:
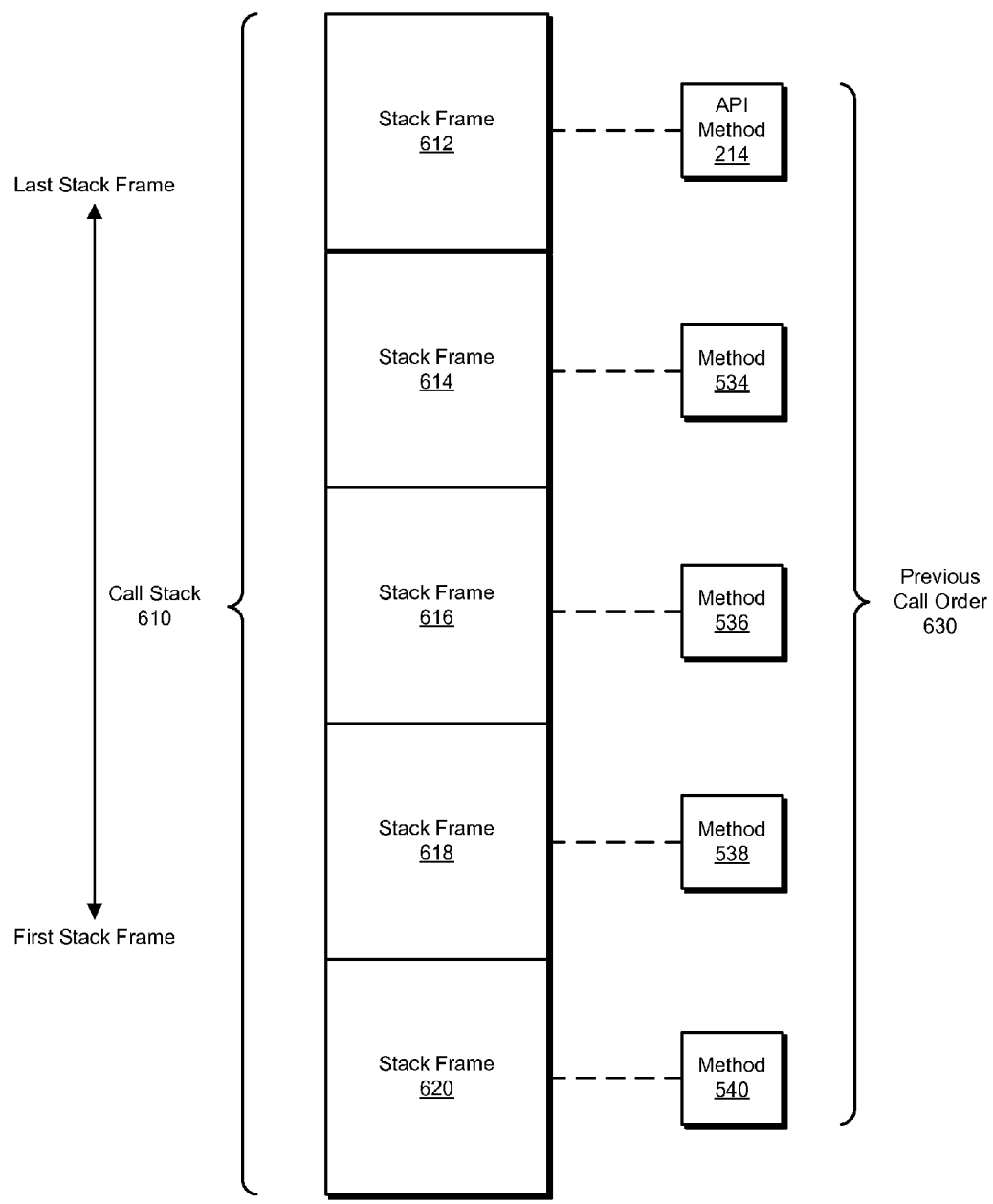
FIG. 6 is a block diagram of an exemplary previous call stack and an exemplary previous call order of the exemplary previous call stack.
Figure 7:
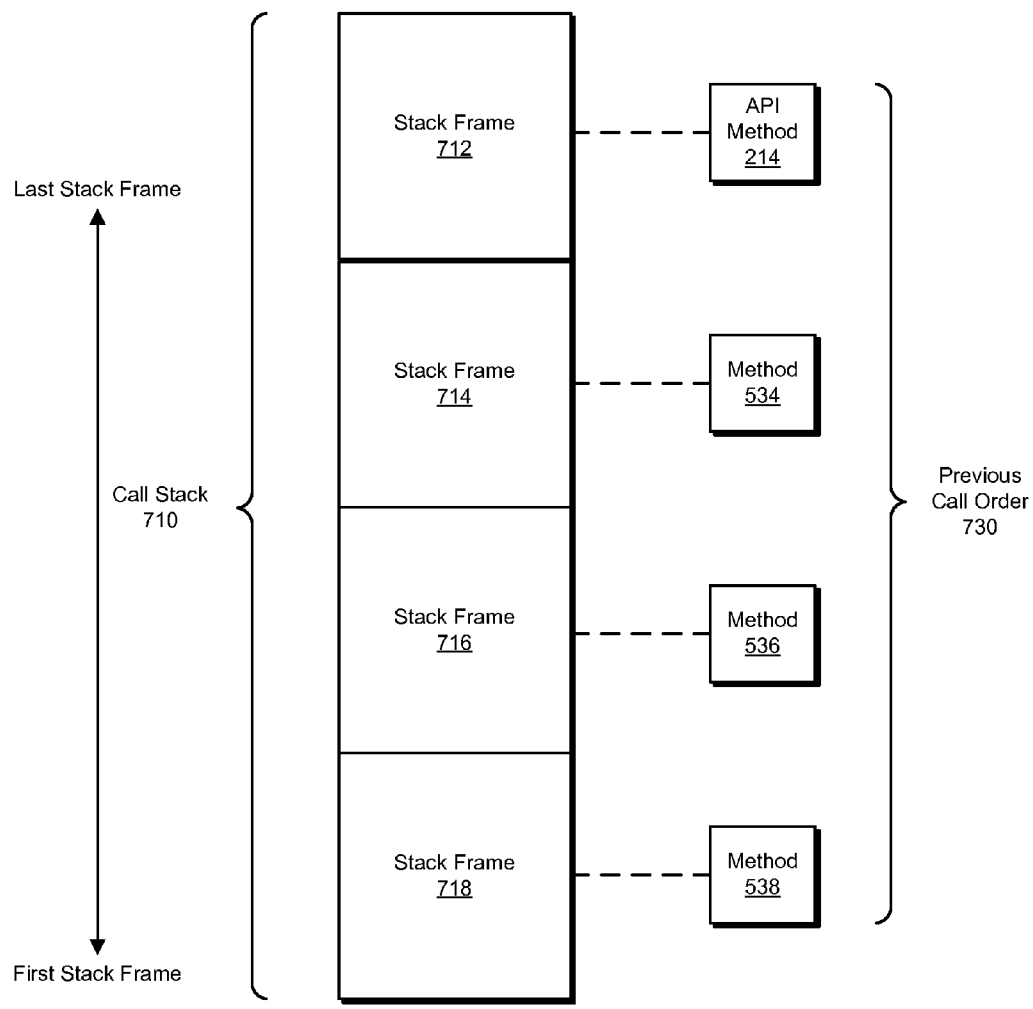
FIG. 7 is a block diagram of an exemplary additional previous call stack and an exemplary additional previous call order of the exemplary additional previous call stack.

Using FIGS. 5 and 6 as an example, inspection module 108 may determine that call order 530 of methods 534-540 does not indicate that methods 534-540 are not authorized to access shared library 212 by comparing call order 530 to previous call order 630 and by determining that the order of methods 534-540 in call order 530 is the same as the order of methods 534-540 in previous call order 630. Using FIGS. 5 and 7 as another example, inspection module 108 may determine that call order 530 of methods 534-540 indicates that methods 534-540 are not authorized to access shared library 212 by comparing call order 530 to previous call order 730 and by determining that the order of methods 534-540 in call order 530 is different than the order of methods 534-538 in previous call order 730 (e.g., previous call order 730 does not include method 540). In this example, method 540 may represent a malicious method that initiated the attempt associated with call stack 210.

In addition to or as an alternative to using policies or call orders, inspection module 108 may determine whether a method that initiated an attempt to access a shared library is authorized to access the shared library based on whether the method has been designated as untrustworthy or trustworthy. In these examples, inspection module 108 may determine that a method that has been designated as untrustworthy is unauthorized and/or that a method that has been designated as trustworthy is authorized. The method may have been designated as untrustworthy or trustworthy in a variety of ways. In some examples, the method may have been designated as untrustworthy or trustworthy by a third party designator and/or a remote system. In at least one example, a method may have been designated as untrustworthy or trustworthy by a third party designator and/or a remote system using reputation-based security technology (such as, e.g., SYMANTEC's INSIGHT technology). In these examples, inspection module 108 may determine that a method is untrustworthy or trustworthy by querying the third party designator and/or the remote system.

Returning now to FIG. 3, at steps 308 or 310, one or more of the systems described herein may cause the attempt to be allowed if the method is authorized to access the shared library or blocked if the method is not authorized to access the shared library. For example, access module 110 may, as part of computing device 202 in FIG. 2, cause the attempt associated with call stack 210 in FIG. 5 to be allowed if inspection module 108 has determined that methods 534-540 are authorized to access shared library 212. Alternatively, access module 110 may, as part of computing device 202 in FIG. 2, cause the attempt associated with call stack 210 in FIG. 5 to be blocked if inspection module 108 has determined that any of methods 534-540 are not authorized to access shared library 212.

Access module 110 may cause attempts to access shared libraries to be allowed or blocked in a variety of contexts. In one example, access module 110 may cause an attempt to be allowed or blocked as part of a shared library. For example, access module 110 may cause an attempt to be allowed or blocked by directly allowing the attempt to access the shared library or by directly blocking the attempt to access the shared library. In at least one example, access module 110 may allow or block an attempt based on a response received from an authorization system such as authorization system 410 in FIG. 4. Using FIG. 4 as an example, at step 408, access module 110 may, as part of shared library 212, allow or block the attempt to access shared library 212 made by process 208 at step 402 based on the authorization response received from authorization system 410 at step 406.

Additionally or alternatively, access module 110 may cause an attempt to be allowed or blocked as part of a local or remote authorization system (e.g., authorization system 410 in FIG. 4) that has received an authorization request from a shared library. In these examples, access module 110 may, as part of the authorization system, cause an attempt to be allowed or blocked by sending a response to the shared library indicating that (1) the attempt is authorize and should be allowed or (2) the attempt is not authorized and should be blocked. In these examples, the shared library may allow or block the attempt based on the response. Using FIG. 4 as an example, authorization system 410 may, at step 406, send an authorization response to shared library 212, and shared library 212 may, at step 408, allow or block the attempt by process 208 made at step 402 based on the authorization response.

In some examples, if an attempt by a process to access a shared library is determined to be authorized, access module 110 may enable one or more subsequent attempts by the process to access the shared library to be allowed in a way that does not cause the call stacks associated with the subsequent attempts to be inspected. In one example, access module 110 may enable one or more subsequent attempts by a process to access a shared library to be allowed by assigning a token to the process. The process may present the token as part of a subsequent attempt to access the shared library, and access 110 may cause, in response to receiving the token as part of the subsequent attempt, the subsequent attempt to be allowed without inspecting the call stack associated with the subsequent attempt.

As described above, by inspecting the call stacks of the processes that are attempting to access shared libraries, the disclosed systems and methods may determine whether to allow the attempts to access the shared libraries. In one example, the disclosed systems and methods may detect an attempt by a process to access a shared library and may determine whether the attempt to access the shared library should be allowed or blocked by (1) inspecting a call stack of the process to identify the methods that initiated the call to the shared library, (2) determining whether the methods are or are not authorized to access the shared library, and (3) determining that the attempt should be allowed if each method is authorized or blocked if any method is not authorized. By determining whether an attempt by a process to access the shared library should be allowed or blocked based on whether the methods of the process that initiated the attempt are authorized to access the shared library, the systems and methods disclosed herein may prevent certain methods of the process from accessing the shared library and/or may prevent the process from accessing the shared library in certain contexts (e.g., an inter-process communication, task delegation, or reflection context).

Figure 8:
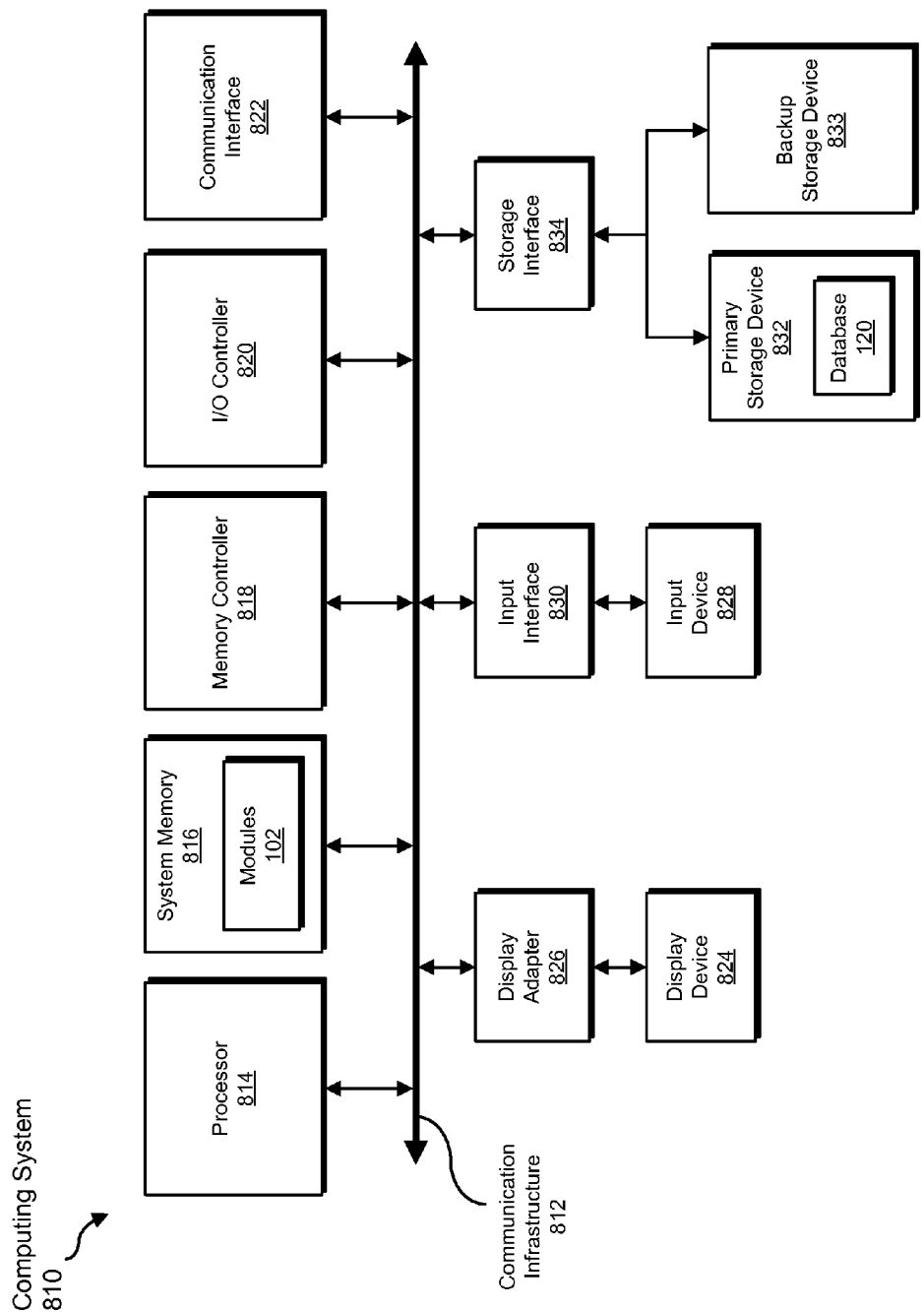
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
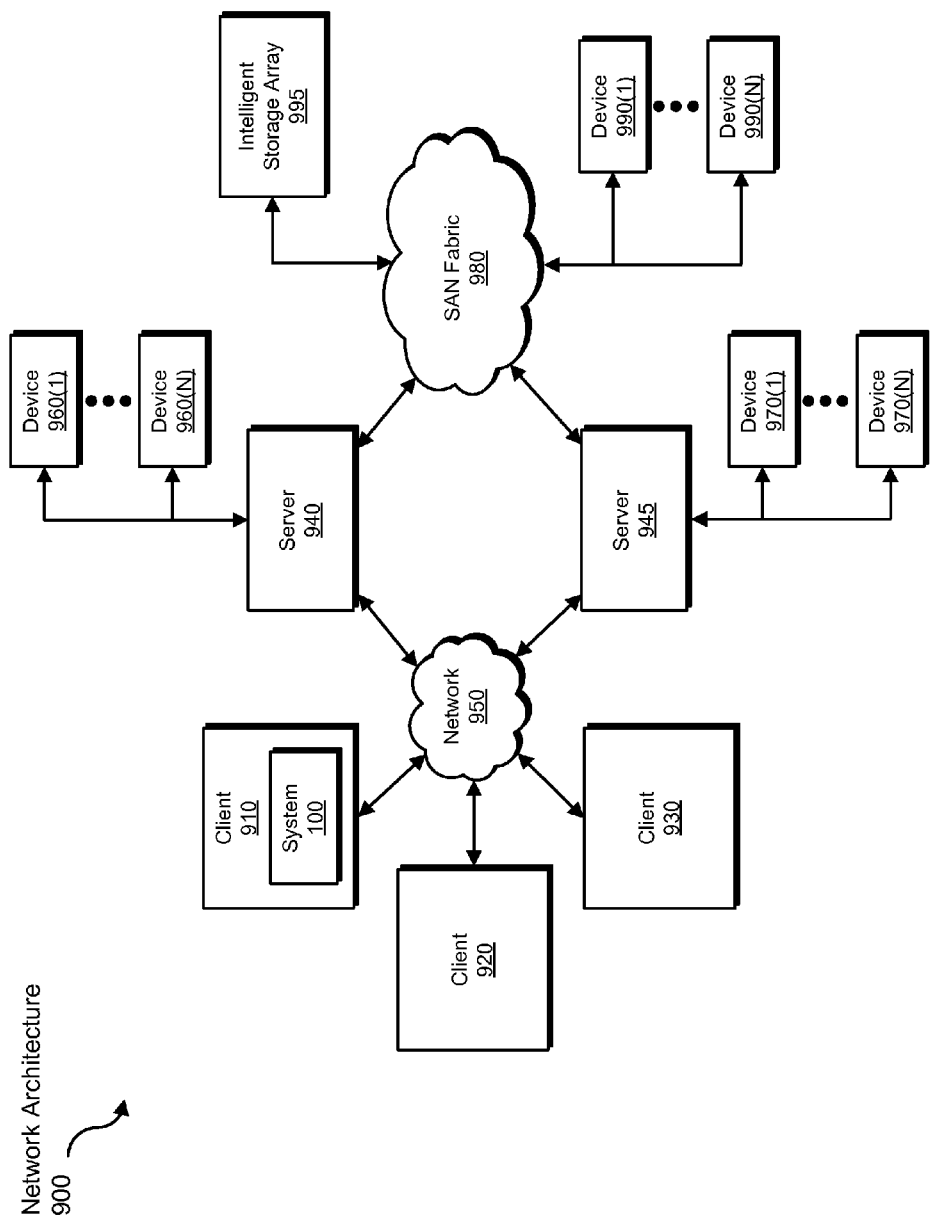
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for authorizing attempts to access shared libraries.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a call stack of a process that is attempting to access a shared library, transform the call stack of the process into a determination that the attempt by the process to access the shared library is authorized or is not authorized, and use the transformation to allow or block the attempt. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for authorizing attempts to access shared libraries, at least a portion of the method being performed by a computing device comprising at least one processor, the method comprising:
   detecting an attempt by a process to access a shared library;
   identifying a call stack of the process;
   inspecting the call stack by:
      identifying a subroutine of the process that initiated the attempt to access the shared library;
      determining that at least one of:
         the subroutine is used to perform inter-process communications;
         the subroutine is used to perform task delegation; and
         the subroutine is used to perform reflection;
      determining that the subroutine is not authorized to access the shared library based at least in part on determining that the subroutine is being used to perform at least one of inter-process communications, task delegation, and reflection; and
   causing the attempt to be blocked in response to determining that the subroutine is not authorized to access the shared library.

2. The computer-implemented method of claim 1, wherein identifying the subroutine that initiated the attempt comprises identifying a stack frame of the subroutine within the call stack.

3. The computer-implemented method of claim 1, wherein identifying the call stack comprises identifying the call stack as part of an authorization system, which performs authorization functions for the shared library, in response to receiving a representation of the call stack from the shared library as part of an authorization request.

4. The computer-implemented method of claim 1, wherein detecting the attempt by the process to access the shared library comprises detecting an attempt to access functionalities of the shared library exposed through an API method of the shared library.

5. The computer-implemented method of claim 1, wherein the steps of the method are performed as part of an authorization system on a remote server.

6. The computer-implemented method of claim 1, wherein identifying the call stack comprises identifying the call stack as part of a shared library using stack-introspection functionality provided by a platform on which the shared library is running.

7. The computer-implemented method of claim 1, further comprising:
   detecting an additional attempt by an additional process to access the shared library;
   identifying a call stack of the additional process;
   inspecting the call stack of the additional process by:
      identifying an additional subroutine that initiated the additional attempt to access the shared library;
      determining that the additional subroutine is not used to perform any one of inter-process communications, task delegation, or reflection;
   determining that the additional subroutine is authorized to access the shared library based at least in part on determining that the additional subroutine is not being used to perform any one of inter-process communications, task delegation, or reflection;
   causing the additional attempt to be allowed in response to determining that the additional subroutine is authorized to access the shared library.

8. The computer-implemented method of claim 7, further comprising:
   assigning a token to the additional process in response to determining that the additional subroutine is authorized to access the shared library;
   receiving the token as part of a subsequent attempt by the additional process to access the shared library;
   causing, in response to receiving the token, the subsequent attempt to be allowed without inspecting a call stack associated with the subsequent attempt.

9. The computer-implemented method of claim 1, wherein inspecting the call stack further comprises inspecting the call stack to identify a call order of a plurality of subroutines that initiated the attempt.

10. The computer-implemented method of claim 9, wherein determining that the subroutine is not authorized to access the shared library comprises determining that the subroutine is not authorized to access the shared library based additionally on the call order of the plurality of subroutines that initiated the attempt.

11. The computer-implemented method of claim 9, wherein:
   inspecting the call stack further comprises determining that the call order of the plurality of subroutines is different than a previous call order of the plurality of subroutines;
   determining that the subroutine is not authorized to access the shared library comprises determining that the subroutine is not authorized to access the shared library based additional on determining that the call order of the plurality of subroutines is different than the previous call order of the plurality of subroutines.

12. A system for authorizing attempts to access shared libraries, the system comprising:
   a detection module, stored in memory, that detects an attempt by a process to access a shared library;
   an identification module, stored in memory, that identifies a call stack of the process;
   an inspection module, stored in memory, that inspects the call stack by:
      identifying a subroutine of the process that initiated the attempt to access the shared library;
      determining that at least one of:
         the subroutine is used to perform inter-process communications;
         the subroutine is used to perform task delegation; or
         the subroutine is used to perform reflection;
      determining that the subroutine is not authorized to access the shared library based at least in part on determining that the subroutine is being used to perform at least one of inter-process communications, task delegation, or reflection;

an access module, stored in memory, that causes the attempt to be blocked in response to determining that the subroutine is not authorized to access the shared library; and at least one physical processor configured to execute the detection module, the identification module, the inspection module, and the access module.

13. The system of claim 12, wherein the inspection module identifies the subroutine that initiated the attempt by identifying a stack frame of the subroutine within the call stack.

14. The system of claim 12, wherein the identification module identifies the call stack by identifying the call stack as part of an authorization system, which performs authorization functions for the shared library, in response to receiving a representation of the call stack from the shared library as part of an authorization request.

15. The system of claim 12, wherein the detection module detects the attempt by the process to access the shared library by detecting an attempt to access functionalities of the shared library exposed through an API method of the shared library.

16. The system of claim 12, wherein the identification module identifies the call stack by identifying the call stack as part of a shared library using stack-introspection functionality provided by a platform on which the shared library is running.

17. The system of claim 12, wherein the inspection module further inspects the call stack by inspecting the call stack to identify a call order of a plurality of subroutines that initiated the attempt.

18. The system of claim 17, wherein the inspection module determines that the subroutine is not authorized to access the shared library by determining that the subroutine is not authorized to access the shared library based additionally on the call order of the plurality of subroutines that initiated the attempt.

19. The system of claim 17, wherein:
the inspection module further inspects the call stack by determining that the call order of the plurality of subroutines is different than a previous call order of the plurality of subroutines;
the inspection module determines that the subroutine is not authorized to access the shared library based additionally on determining that the call order of the plurality of subroutines is different than the previous call order of the plurality of subroutines.

20. A non-transitory computer-readable medium comprising one or more computer-readable instructions that, when executed by at least one processor of a computing device, cause the computing device to:
detect an attempt by a process to access a shared library;
identify a call stack of the process;
inspect the call stack by:
    identifying a subroutine of the process that initiated the attempt to access the shared library;
    determining that at least one of:
        the subroutine is used to perform inter-process communications;
        the subroutine is used to perform task delegation;
        the subroutine is used to perform reflection;
determine that the subroutine is not authorized to access the shared library based at least in part on determining that the subroutine is being used to perform at least one of inter-process communications, task delegation, or reflection; and
cause the attempt to be blocked in response to determining that the subroutine is not authorized to access the shared library.

* * * * *

UNITED STATES PATENT AND TRADEMARK OFFICE
CERTIFICATE OF CORRECTION

PATENT NO.       : 9,509,697 B1
APPLICATION NO.  : 14/486323
DATED            : November 29, 2016
INVENTOR(S)      : Salehpour Page 1 of 1

It is certified that error appears in the above-identified patent and that said Letters Patent is hereby corrected as shown below:

In the Claims

Claim 11, Column 20, Line 45 should read:

based additionally on determining that the call order of

Signed and Sealed this
Twenty-first Day of February, 2017

Michelle K. Lee
*Director of the United States Patent and Trademark Office*